United States Patent [19]

Basili

[11] Patent Number: 5,651,644

[45] Date of Patent: Jul. 29, 1997

[54] ROTARY SHAVING CUTTER WITH ALTERNATIVELY ARRANGED PLATES

[76] Inventor: Sante Basili, Via G. Dozza, No. 38, 40065 Pianporo, Bologna, Italy

[21] Appl. No.: 263,579

[22] Filed: Jun. 22, 1994

Related U.S. Application Data

[63] Continuation-in-part of Ser. No. 994,722, Dec. 22, 1992, abandoned.

[51] Int. Cl.$^6$ ................................................. B23F 21/28
[52] U.S. Cl. ................................................. 407/27; 407/31
[58] Field of Search ................................. 407/27, 31

[56] References Cited

U.S. PATENT DOCUMENTS

| | | |
|---|---|---|
| 2,119,298 | 5/1938 | Simawski . |
| 2,305,145 | 12/1942 | Dalzen . |
| 3,875,630 | 4/1975 | Taniguchi et al. . |
| 3,960,055 | 6/1976 | Psenka et al. . |
| 4,266,449 | 5/1981 | Bielby ............................. 76/101 A |
| 4,268,569 | 5/1981 | Hale ................................ 428/215 |
| 4,848,040 | 7/1989 | Nishino ........................... 51/287 |

FOREIGN PATENT DOCUMENTS

| | | | |
|---|---|---|---|
| 1037812 | 8/1958 | Germany | 407/27 |
| 3230177 | 2/1984 | Germany | 407/27 |
| 224283 | 11/1968 | U.S.S.R. | 407/27 |

Primary Examiner—Daniel W. Howell
Assistant Examiner—Kenneth J. Hansen
Attorney, Agent, or Firm—Young & Basile, PC

[57] ABSTRACT

A wafer shaving cutter includes a plurality of first annular plates alternatingly arranged with spacers or second plates and joined together into a fixed member. Each of the first plates includes a plurality of circumferentially spaced teeth, each tooth having opposed side lands formed in a predetermined gear profile. The width of each tooth on the spacers is smaller than the corresponding tooth width of each tooth on the first plates to form grooves between adjacent cutting edges of adjacent disposed first plates. In one embodiment, a plurality of teeth having a smaller width than the teeth on the first plates are spacedly formed about each of a plurality of second plates alternatingly arranged with the first plates. The major faces of the first plates and the spacers or second plates are surface ground to a smooth finish. In a preferred embodiment, the teeth on the first and second plates are helically arranged along the shaving cutter.

15 Claims, 7 Drawing Sheets

ROTARY SHAVING CUTTER WITH ALTERNATIVELY ARRANGED PLATES

CROSS REFERENCE TO CO-PENDING APPLICATION

This application is a continuation-in-part application of United States patent application Ser. No. 07/994,722, filed Dec. 22, 1992, now abandoned in the name of Sante Basili and entitled "ROTARY WAFER SHAVING CUTTER".

BACKGROUND OF THE INVENTION

1. Field of the Invention

The present invention relates, in general, to rotary shaving cutters for finishing gear teeth.

2. Description of the Art

Figure 10:
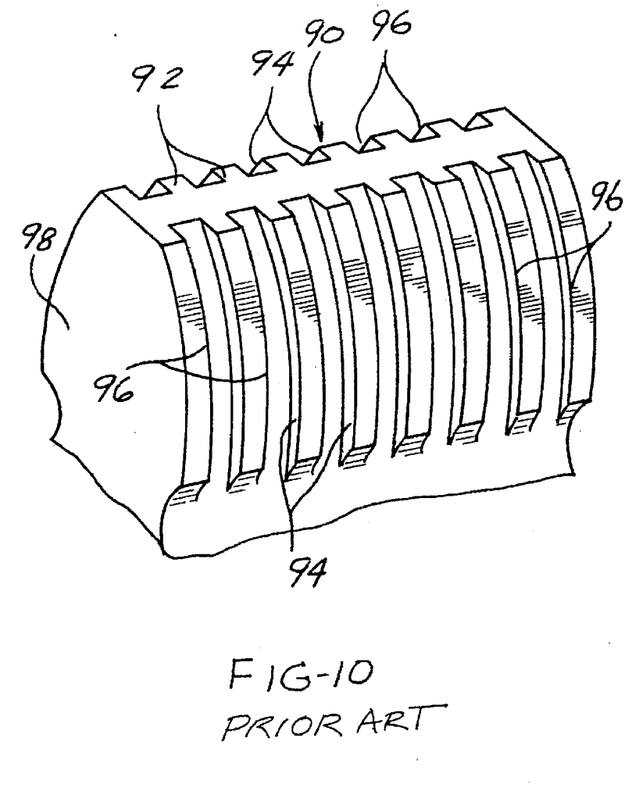
FIG. 10 is an enlarged perspective view of one tooth of a prior art shaving cutter.

The use of rotary shaving cutters for finishing gear teeth previously formed by a hobbing or shaping operation has been known for quite a long time. Such shaving cutters typically have a circular array of radially extending teeth, with the cutting edge profile of each tooth lying in a plane, in one arrangement perpendicular to the bore axis between opposite sides of the shaving cutter. Each cutting edge profile is formed at the intersections of a land surface and an adjacent serration surface. FIG. 10 shows one tooth of a prior art shaving cutter 90. The tooth 90 includes cutting edge profiles 96 formed by land surfaces 92 and serration surfaces 94 equally spaced along the face width of the tooth 90.

The profile of the cutting edges of each tooth of a shaving cutter will have a conjugated shape to the desired profile of the teeth of the work gear to be shaved. Usually, the work gear is driven by the shaving cutter in a tooth-to-tooth meshing relationship at skewed axes. The entire shaving operation is done through the entire face width of the work gear by either reciprocating the work gear across the shaving cutter with parallel or diagonal motion or just by plunging the work gear into the wider plunge-type shaving cutter.

Such shaving cutters are typically formed as a one-piece body with the serrated teeth being shaped one side at a time for each complete tooth. This process requires two accurate machine set-ups for each shaving cutter and long shaping operations to produce the finished shaving cutter.

It is well known in the cutting tool art that the life of a shaving cutter depends on how smoothly the surface finish of the cutting edges can be formed. When the teeth of a shaving cutter become worn due to repeated cutting of work gear teeth, it is necessary to re-sharpen the shaving cutter teeth to restore the sharpness of the cutting edges. Typically, a grinding wheel is passed along the shaving cutter tooth spaces to remove material stock from the tooth flanks to resharpen the cutting edges. However, due to the roughness of the serration surface, i.e., the serration surfaces 94 of the prior art shaving cutter shown in FIG. 10, the cutting edge profiles 96 after the resharpening operation may not be smooth enough to shave the expected number of work gears. As a result of this poor performance, the cost per work gear produced by a single shaving cutter may tangibly increase.

The life of a conventional shaving cutter varies between 2,000 and 10,000 parts per resharpening. The upper limit on the number of parts capable of being formed by previously devised shaving cutters between resharpenings is limited by the manner in which the grooves of the shaving cutters are manufactured. Even in previously devised shaving cutters formed of a plurality of individual plates which are fixedly joined together on an axially extending body, the cutting edges formed on alternating plates have been carefully manufactured, but little attention has been played to the surface finish of the plates themselves. For long life and strength, such plates are typically hardened after being initially stamped or otherwise formed to the desired dimensional shape. However, as is well known, such hardening introduces variations or distortions in such plates which results in a tolerance buildup over the length of the shaving cutter which can lead to inaccuracies in finishing a gear. While such tolerance buildup due to variations in the thickness of each plate is less of a problem in a spur shaving cutter, such variations create a more significant problem in a helical shaving cutter. The tolerance buildup caused by varying thickness cutting and spacer disks can vary the helical arrangement of the cutting teeth along the length of the cutter and thereby if used as it is would lead to significant inaccuracies in the finished gear teeth. To correct this problem, it may require long grinding stock time of the teeth profile and the possible elimination of the serration cutting edge depth in the shaving cutter. Applicant has uniquely discovered that the better the surface finish on the faces of the plates of a wafer-type shaving cutter as well as a surface finish on the major faces of the teeth on each plate, the longer the useful life of the shaving cutter between resharpenings.

It would be therefore desirable to provide a shaving cutter which overcomes the problems of previously devised shaving cutters. It would also be desirable to provide a shaving cutter which enables a smooth surface finish to be easily provided on the cutting edges of the shaving cutter teeth so as to increase the usable life of the shaving cutter between re-sharpening operations. It would also be desirable to provide a shaving cutter which can be more easily manufactured than previous shaving cutters. It would also be desirable to provide a shaving cutter which enables virtually any angle to be formed in the cutting edges of the shaving cutter teeth. It would also be desirable to provide a shaving cutter whose cutting edges can be titanium nitride or titanium carbide coated to further increase the life of the shaving cutter between re-sharpenings. It would be desirable to provide a shaving cutter which has symmetrical cutting edges on each tooth to equalize cutting pressure on each tooth of a work gear so as to improve the surface finish and smooth cut of a work gear. Finally, it would be desirable to provide a shaving cutter in which a smooth surface finish is formed on each plate for constant plate thickness along the axial length of the shaving cutter.

SUMMARY OF THE INVENTION

The present invention is a wafer shaving cutter for shaving a predetermined finish profile on the teeth of a work gear.

Generally, the present shaving cutter includes a plurality of first plates each having a plurality of circumferentially spaced gear teeth formed thereon with each tooth having an outer land and opposed side faces extending radially therefrom and formed in a predetermined gear tooth profile. Cutting edges are formed at the edge of each side face and the adjacent front and rear surfaces of each first plate. The cutting edges have a conjugated profile to the profile of the teeth of the work gear to be shaved. Spacer means are disposed between each of the first plates to space the teeth of the plurality of first plates apart and to form grooves between the teeth on each of the first plates. Joining means interconnect the first plates and the spacer means into a fixed structural member.

In one embodiment, the spacer means comprises shoulders having a reduced diameter which is integrally formed with each of the first plates and extending axially outward from one surface of each of the first plates. The joining means comprises a plurality of circumferentially spaced bores formed in and extending through the first plates and the shoulders. Fasteners extend through the aligned bores in the plurality of first plates and the shoulders to join the plurality of first plates together in a fixed structure.

In another embodiment, the spacer means comprises a plurality of second plates having a ring-like shape and a diameter less than the diameter of the bases of the teeth on each of the plurality of first plates. One of the second plates is alternately disposed between adjacent first plates to space the first plates apart at a predetermined distance and to form grooves between the teeth on adjacent first plates for chip removal.

In yet another embodiment, the joining means comprises a body having first and second opposed ends. The body includes an enlarged first end portion having circumferentially spaced teeth of a size and shape smaller than the teeth on the first plates. An intermediate sleeve extends longitudinally from the enlarged first end portion to the second end of the body. The plurality of first plates and the spacer means are mounted on the intermediate sleeve. An end plate is mounted on the second end of the body. Aligned bores extend through the enlarged first end portion of the body, each of the first plates and the spacer means, and the end plate and receive fasteners to join the body, the first plates, the spacer means and the end plate together into a rigid unit.

In another embodiment of the body, the body includes a reduced diameter second end portion forming a shoulder between the reduced diameter second end portion and the intermediate sleeve. The end plate is mounted on the reduced diameter second end portion of the body. A second set of aligned bores extend through the body, the intermediate sleeve of the body, and the end plate and receive fasteners to join the end plate and the body together.

In another embodiment, the spacer means also includes a plurality of second plates each having a plurality of circumferentially spaced gear teeth formed thereon, with each tooth having an outer land and opposed side faces extending radially therefrom and formed in a predetermined gear tooth profile. The tooth width of each of the plurality of second plates is less than the tooth width of each tooth formed on the first plates. The plurality of first and second plates are alternatingly mounted on the body between the first and second ends thereof. As a result, the side faces of the second plates form grooves between the side faces of adjacent first plates.

Optionally, a plurality of circumferentially spaced through or partial bores may be formed in a central portion of the body to reduce the weight of the body and the complete shaving cutter. For helical shaving cutters, the body, the plurality of first and second plates, and the end flange have their teeth timed in a helical relationship.

Means are provided for forming the cutting edge profiles of each tooth on the plurality of first plates at a predetermined identical angle equal to make the interior angles of all four cutting edges of each tooth identical. In a preferred embodiment, a groove is formed on at least one pair of diagonally opposed surfaces of each tooth to form diagonally opposed cutting edges having an interior angle with the adjacent side face of each tooth equal to the interior angle of the opposed diagonal pair of cutting edges.

In a preferred embodiment, the teeth on each of the first plates are formed to enable the teeth on a plurality of axially aligned first plates to extend helically along the length of the shaving cutter for shaving a helical gear. In this preferred embodiment, the interior angle between opposed surfaces on each diagonally opposed edge of each cutting tooth are equal to each other or, in an alternate embodiment, the angles of each diagonally opposed pair of cutting edges have different interior angles.

Further, according to a preferred embodiment, the opposed major faces of each of the first and second plates are surface ground to a smooth finish which forms each of the first plates to an identical thickness and, also, forms the second plates to an identical thickness. This smooth surface finish enables the first and second plates, as well as the cutting teeth formed on the first late and the spacer teeth on the second plate, to be arranged helically along the length of the shaving cutter. In addition, the smooth surface finish increases the useful life of the shaving cutter of the present invention between required resharpenings.

The shaving cutter of the present invention overcomes certain problems encountered with previous devised shaving cutters. Since the shaving teeth on each of the plurality of first and second plates may be formed one plate at a time, virtually any angle may be formed on the cutting edge profiles of each tooth by a simple grinding operation. Further, a sequential set of cutting edges may be formed on each tooth of each first plate so as to lie in a helix curve to suit plunge-type shaving operations. The number of first plates and the number of teeth thereon may be chosen according to the face width of the first plates and the number of teeth in the work gear. As all of the plates of each of the plurality of first and second plates are identically constructed, machine setup time is reduced thereby enabling the wafer shaving cutter of the present invention to be manufactured at a reduced cost and, at the same time, provide the afore-mentioned advantages of smooth cut, equal cutting pressures, and longer cutter life.

Another advantage of the present wafer shaving cutter is the possibility of repairing or replacing damaged or worn plates at a low cost. Any defective or extremely worn plates can merely be removed from the cutter and replaced by a new plate thereby eliminating the need of a completely new shaving cutter.

Finally, by uniquely providing a smooth ground finish on each of the plates of the present wafer shaving cutter, the useful life of the present wafer shaving cutter between resharpenings is substantially increased over that of previously devised shaving cutters. Further, the smooth ground finish on each of the plates ensures that each of the first and second plates is of an identical thickness to corresponding first and second plates which enables the plates and the teeth formed thereon to be arranged in a helical manner along the shaving cutter for shaving a helical gear. A further increase in useful life between resharpenings is also attained by coating the cutting edges of the teeth on the first plates with a suitable smooth coating of titanium carbide or titanium nitride.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Broadly, the wafer shaving cutter 10 includes a plurality of first, annular plates, each having a plurality of circumferentially spaced teeth formed thereon. Each tooth has an outer land and opposed side faces extending radially therefrom in a predetermined gear tooth profile. Means are provided for spacing each first plate from adjacent first plates by a predetermined distance, with each tooth on each first plate aligned with a tooth on an adjacent first plate to form a composite tooth with grooves therebetween across the length of the plurality of first plates. Means are also provided for joining all of the first plates and the spacing means together into a rigid, unitary body.

Figure 1:
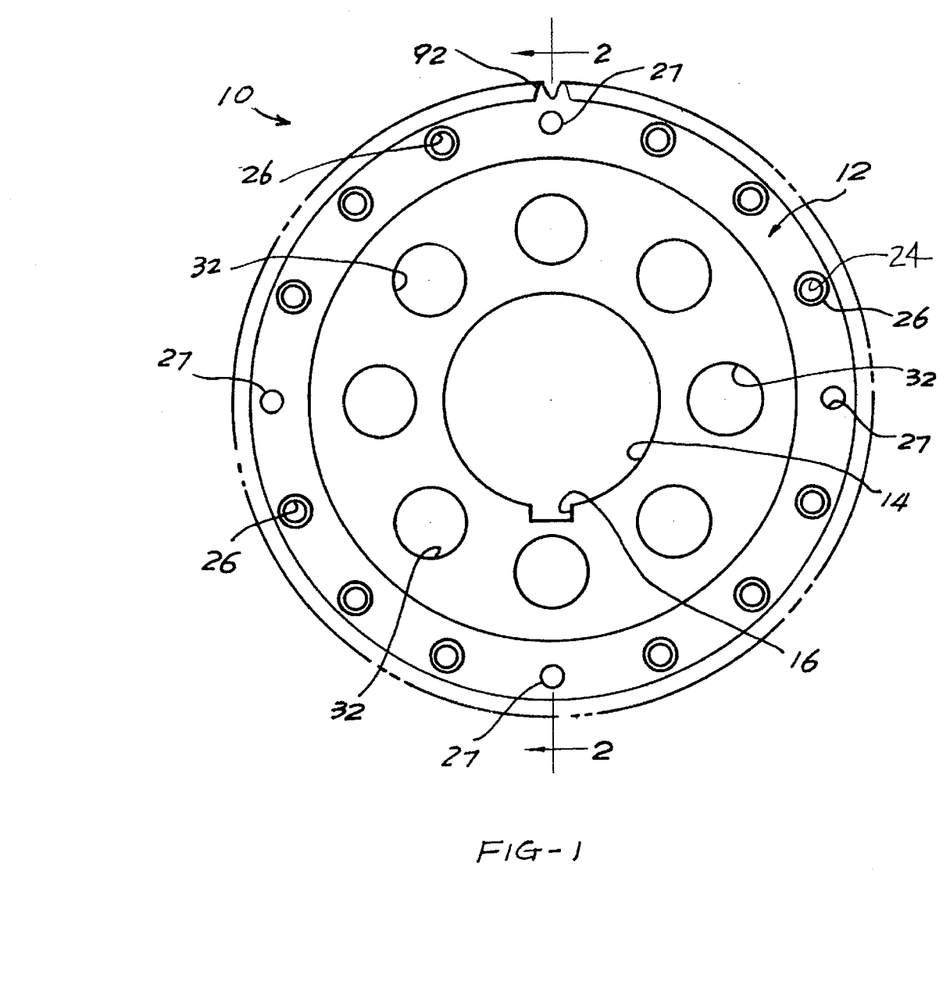
FIG. 1 is a front elevational view of a shaving cutter constructed in accordance with the teachings of the present invention.
Figure 2:
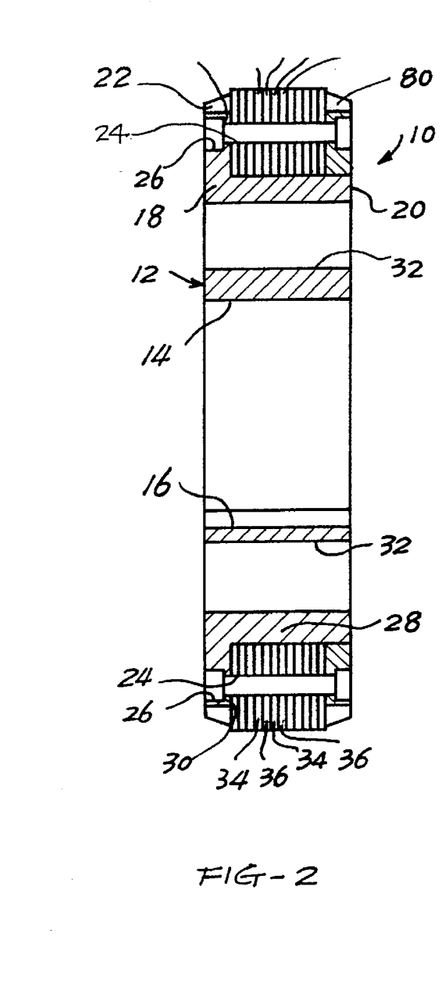
FIG. 2 is a cross sectional view generally taken along line 2—2 in FIG. 1.
Figure 3:
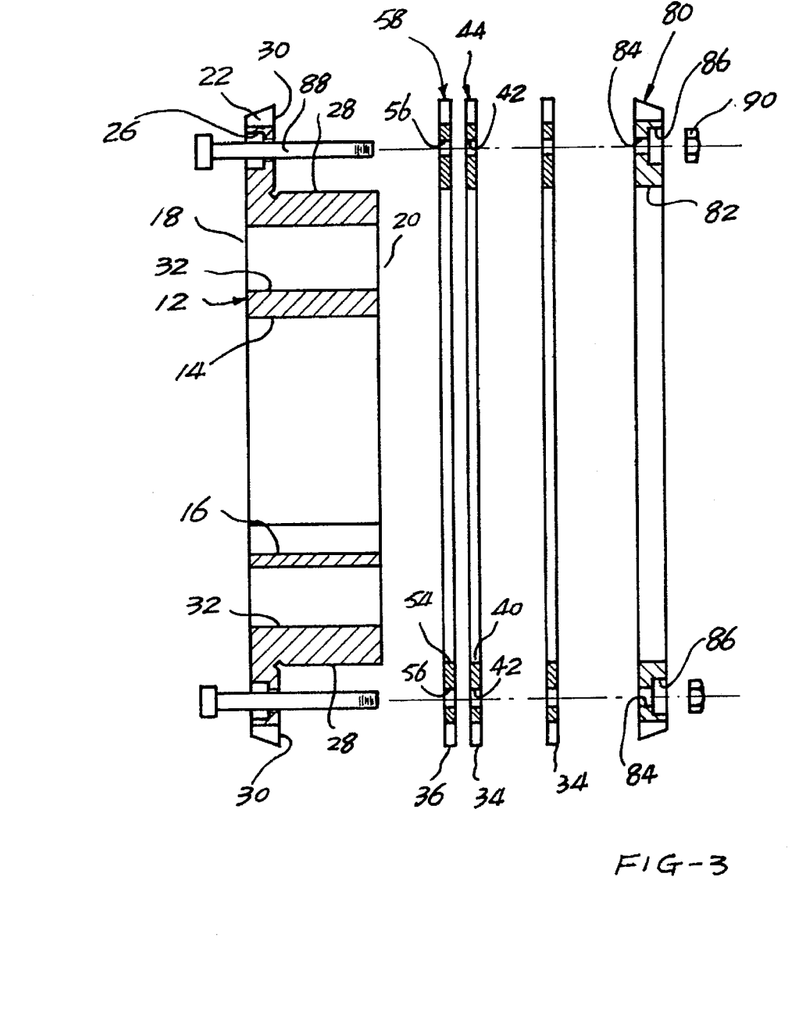
FIG. 3 is an exploded, cross sectional view similar to FIG. 2.

Referring now to the drawing, and to FIGS. 1-3 in particular, there is illustrated one embodiment of a wafer shaving cutter 10 designed to shave or finish the gear teeth of a work gear to a predetermined profile and surface finish. In this embodiment, the joining means includes a body denoted generally by reference number 12. The body 12 is formed of a suitable high strength material, such as steel, which is heat treated to a predetermined case depth. The body 12 has a generally circular shape with a central bore 14 extending therethrough. One or more key slots 16 are formed along the bore 14 to fixedly mount the body 12 on a suitable rotary machine.

The body 12 has first and second opposed ends 18 and 20, respectively. An annular first end portion 22 is formed on the body 12 adjacent the first end 18 thereof. The first end portion 22 has a predetermined first diameter. A plurality of bores 24, each with an enlarged outer end portion 26 opening to the first end 18 of the body 12 are formed in the first end portion 22 and circumferentially spaced thereon. A plurality of through bores 27 are also formed in and extend through the body 12. The bores 27 are disposed at predetermined angular locations between the bores 24.

An intermediate sleeve 28 having a second diameter, smaller than the first diameter of the first end portion 22 is formed in the body 12 and extends from the first end portion 22 to the second end 20 of the body 12. An annular shoulder 30 is formed at the junction of the first end portion 22 and the intermediate sleeve 28. A plurality of through bores 32 are optionally formed in the body 12 between the central bore 14 and the bores 26 and extend completely through the body 12 between the first and second ends 18 and 20 thereof. The bores 32 serve to reduce the weight of the body 12.

The shoulder 30 and the outer peripheral surface of the intermediate sleeve 28 form a support surface for a plurality of alternating first and second plates 34 and 36, respectively. As shown in FIGS. 3–6, each of the plurality of first plates 34 has the same identical, ring-like shape with opposed major faces 33 and 35. A central bore 40 is formed in each first plate 34 at a diameter corresponding to the outside diameter of the intermediate sleeve 28 on the body 12 so as to securely, yet removably, mount each of the first plates 34 on the body 12. A plurality of circumferentially spaced bores 42 are also formed in each first plate 34 at a predetermined radius from the center of each first plate 34 corresponding to the position of the bores 24 and 27 in the first end portion 22 of the body 12. The purpose of the bores 42 will be described hereafter.

A plurality of serrated-type cutting teeth 43 are formed in a circumferentially spaced manner at the outer periphery of the shaving cutter 10. Each tooth 43 is formed of a number of individual teeth on each of the first plates 34. Only two of the cutting teeth 43 are shown in FIG. 5. As shown in greater detail in FIGS. 4 and 6, the cutting tooth 44 of each first plate 34 is formed with a top land 46 and opposed side lands 48, preferably of identical shape and having a conjugated profile to the profile of the tooth of a work gear to be shaved by the shaving cutter 10. The side lands 48 extend between the top land 46 and spaced bottom lands 50. Each of the teeth 44 of the first plates 34 has a predetermined tooth width as denoted by reference number 52 in FIG. 6. Further, the major faces of each tooth 42 are formed as a continuous, co-planar extension of the major faces 33 and 35 of the first plate 34.

Figure 7:
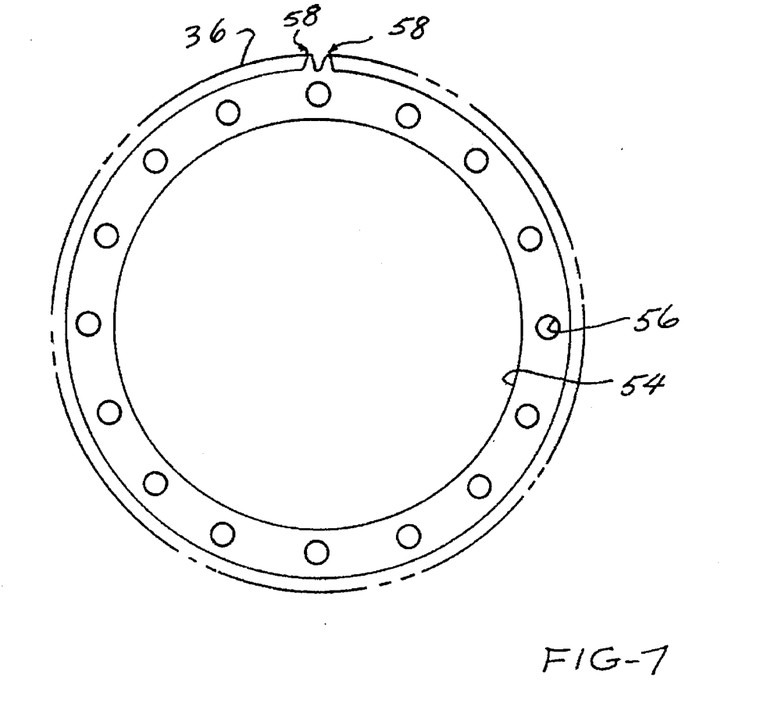
FIG. 7 is a front elevational view of a second plate of the present shaving cutter.

In the first embodiment of the present wafer shaving cutter 10, the spacing means includes the plurality of second plates 36. As shown in FIG. 7, each of the second plates 36 has a ring-like shape substantially identical to the shape of the first plates 34 and has opposed major faces 37 and 39. Each of the second plates 36 includes a central bore 54 having a diameter corresponding to the outside diameter of the intermediate sleeve 28 on the body 12. A plurality of radially spaced, smaller bores 56 are formed adjacent the periphery of each second plate 36 and are alignable with the bores 42 in the first plates 34, as described hereafter.

Figure 8:
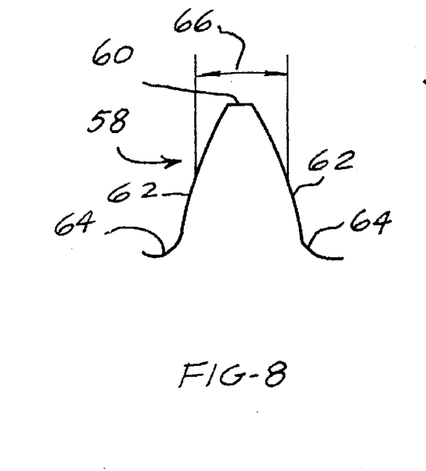
FIG. 8 is an enlarged, front elevational view of one of the cutting teeth of the second plate shown in FIG. 7.
Figure 9:
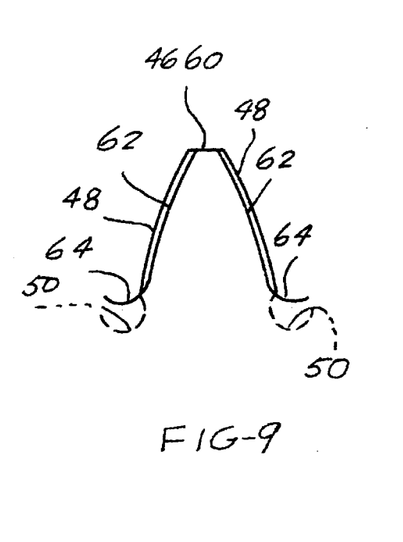
FIG. 9 is an enlarged, pictorial representation of the dimensional relationship between the cutting teeth of the first and second plates.

Each second plate 36 includes a plurality of circumferentially spaced teeth 58. Each tooth 58 includes a top land 60 and opposed side lands 62 of a predetermined profile. The side lands 62 extend between the top land 60 and spaced bottom lands 64. Each tooth 58 on the second plates 36 has a predetermined tooth width denoted by reference number 66 which is smaller than the tooth width 52 of each of the cutting teeth 44 on the first plates 34. Further, the opposed major faces of each tooth 58 are formed as continuous extensions of the major faces 37 and 39 of the second plate 36.

Figure 4:
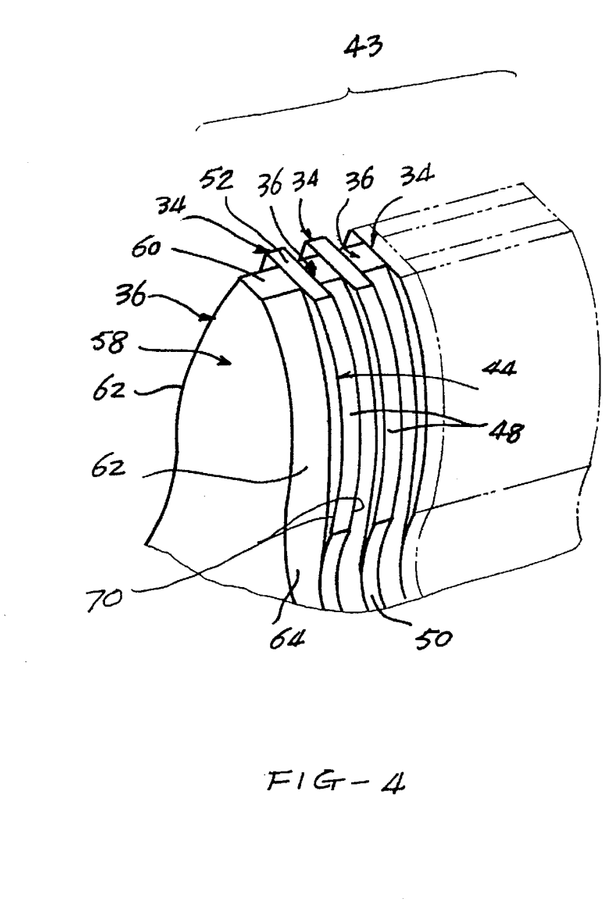
FIG. 4 is an enlarged, perspective view showing the construction of the serrated cutting teeth of the shaving cutter of the present invention.
Figure 5:
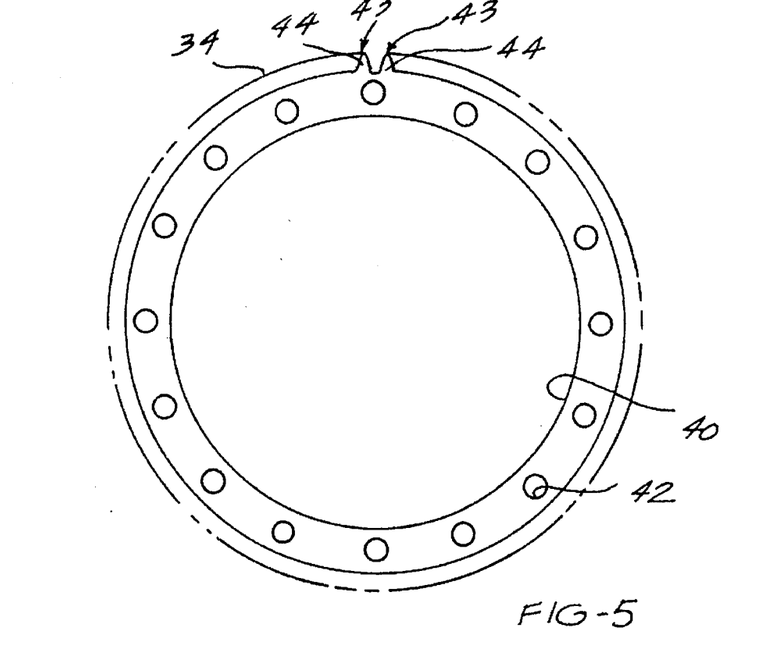
FIG. 5 is a front elevational view of one of the first plates of the shaving cutter shown in FIG. 1.
Figure 6:
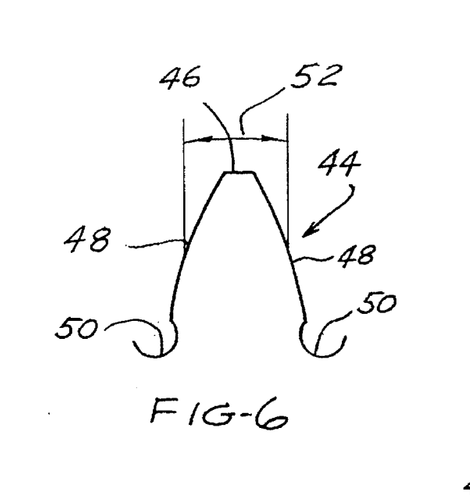
FIG. 6 is an enlarged, front elevational view of one of the cutting teeth of the first plate shown in FIG. 5.

The first and second plates 34 and 36 are mounted in an alternating manner on the intermediate sleeve 28 of the body 12 such that a first plate 34 is disposed between two adjacent, spaced second plates 36, as shown in FIG. 2 and 4. The smaller tooth width 66 of each of the teeth 58 on the second plates 36, which is less than the tooth width 52 of the cutting teeth 44 on the first plates 34, forms chip removal grooves between the side lands 48 of adjacently disposed first plates 34. Further, cutting edges 70, as shown in FIG. 4, are formed at the juncture of each side land 48 and the adjacent major faces of each tooth 44 for shaving the tooth of a work gear to the desired profile corresponding to the profile of the side lands 48 of the cutting teeth 44 of the first plates 34.

The cutting edges 70 may be formed by simple grinding operations, for example, to a smooth finish and at any desired angle. Preferably, the cutting edges 70 on opposite sides of each of the cutting teeth 44 are disposed at the same angle to equalize cutting pressures. The cutting edges 70 can also be coated by suitable materials, such as titanium carbide or titanium nitride, to produce a smooth surface for the cutting edges 70 and to lengthen the life of the shaving cutter 10 between re-grinding operations.

According to the present invention, the major faces 33 and 35 of all of the first plates 34, the major faces 37 and 39 of all of the second plates 36, as well as the major faces of each tooth 44 and 58 on each of the first and second plates 34 and 36 are first surface ground to a smooth finish. The smooth finish ensures that all of the first plates 34 have an identical thickness and all of the second plates 36 have an identical thickness. This improves accuracy in use of the shaving cutter 10, particularly in a helical shaving cutter configuration, as well as substantially increasing the life of the shaving cutter 10 between resharpenings.

A separate end flange denoted by reference number 80 is mounted on the body 12 adjacent the second end 20 of the body 12. The second end flange 80 has a generally circular configuration with an internal bore 82 sized to correspond to the outside diameter of the intermediate sleeve 28 on the body 12 so as to enable the second end flange 80 to be slidably mounted on the body 12.

A plurality of circumferentially spaced bores 84, each having a large diameter end portion 86, are also formed in the end flange 80 and are alignable with the bores 42 and 56 in the first and second plates 34 and 36, respectively, as well as the bores 24 and 27 in the first end portion 22 of the body 12. Suitable fastening means, such as a headed bolt 88 and a nut 90, are extendable through each set of aligned bores in the first end portion 22, each of the first and second plates 34 and 36, and the end flange 80 to securely mount the plurality of first and second plates 34 and 36 and the end flange 80 on the body 12 as well as to maintain each of the teeth 44 and 58 of the plurality of first and second plates 34 and 36 in alignment between the first and second ends 18 and 20 of the body 12. The fasteners 88 and 90 can be removed to enable the first and second plates 34 and 36 to be taken off of the body 12 for replacement when the cutting teeth 44 of the first plates 34 become too worn or are broken.

A plurality of cutting teeth 92, as shown in FIG. 1, are formed in a circumferentially spaced manner about the periphery of the enlarged end portion 22 of the body 12 and the end plate 80. In this embodiment, the teeth 92 preferably have the same size and shape as the teeth 58 on the second plates 36. The teeth 92 are aligned with the teeth 44 and 58 across each complete tooth 43 of the shaving cutter 10.

Figure 11:
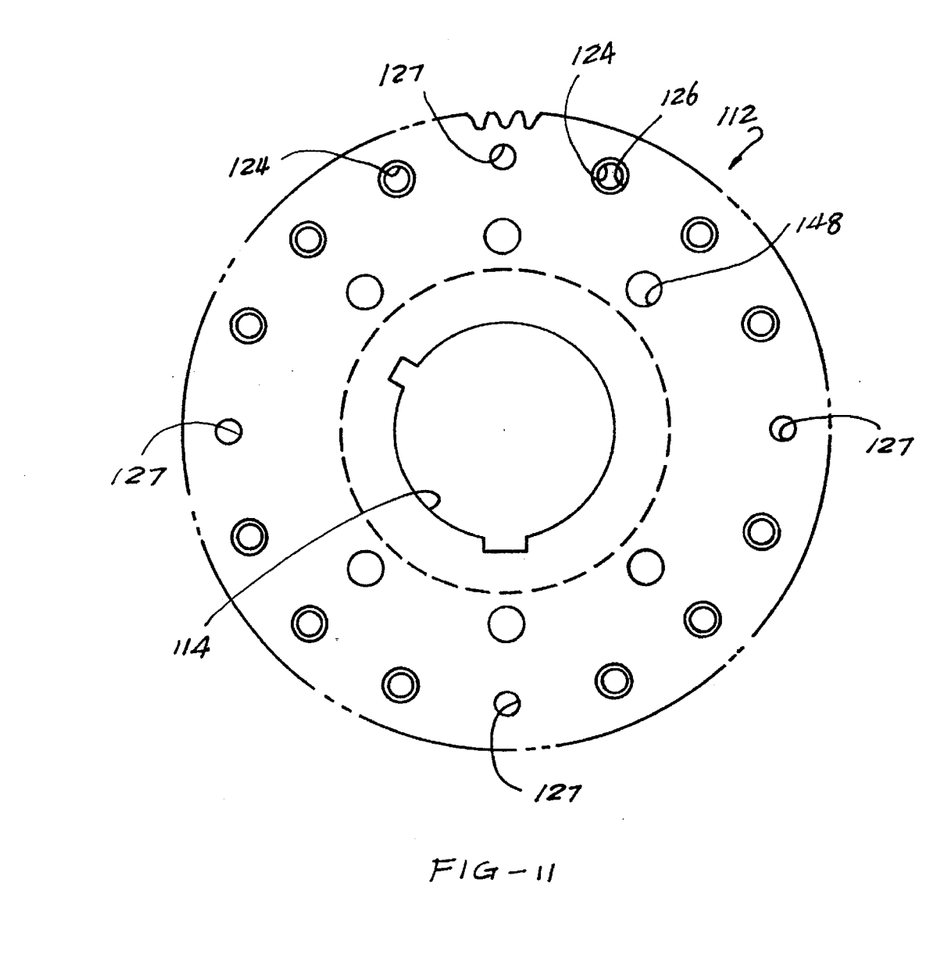
FIG. 11 is a front elevational view of an alternate embodiment the body of the shaving cutter of the present invention.
Figure 12:
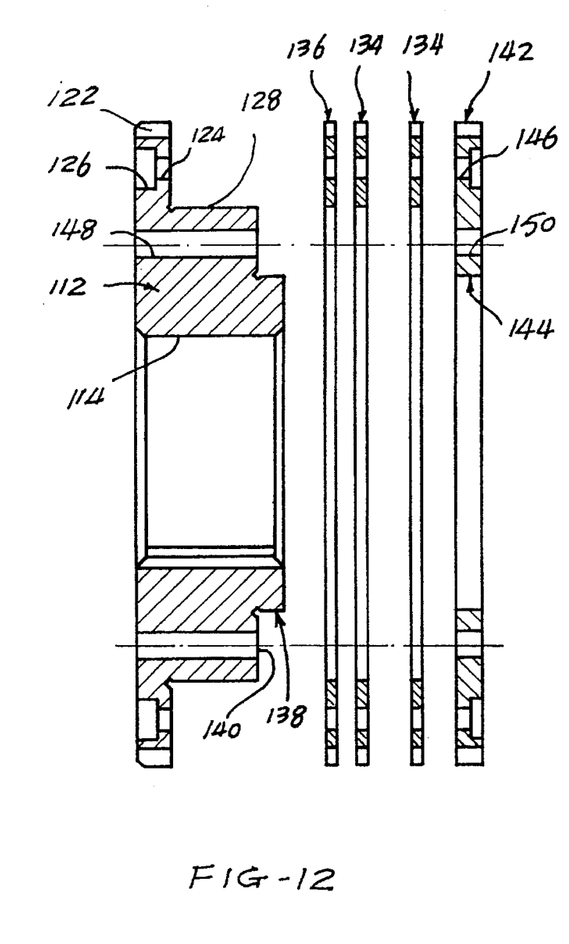
FIG. 12 is an exploded, cross sectional view showing the body, plates and end plate of the alternate embodiment shown in FIG. 11.

Another embodiment of the shaving cutter of the present invention is shown in FIGS. 11 and 12. In this embodiment, the body 112 is substantially identical to the body 12 shown in FIGS. 1 and 2 and described above, but includes several modifications. The body 112 includes an enlarged first end portion 122 and an intermediate sleeve 128. A plurality of through bores 124, each with an enlarged end portion 126, are circumferentially spaced about the first end portion 122. Straight through bores 127 are also formed in the enlarged first end portion 122 and are angularly positioned between certain of the bores 124.

A plurality of first and second plates 134 and 136, identical to the plates 34 and 36 described above, are alternatingly mounted on an intermediate flange 128 of the body 112. Circumferentially spaced, peripherally arranged bores formed in the plates 134 and 136 are alignable with the bores 124 and 127 in the first end portion 122 of the body 112.

A reduced diameter sleeve 138 is formed on the body 112 adjacent the second end thereof, contiguous with and forming a shoulder 140 with the end of the intermediate shoulder 128. An end plate 142 has a central bore 144 sized to rest upon the reduced diameter 138 of the body 112. Circumferentially spaced bores 146 are formed in the end plate 142 and are alignable with the bores 124 and 127 in the body 112 and the corresponding bores in the plates 134 and 136. A suitable fastener, such as a nut and bolt, may be mounted in the aligned bores to securely join the teeth of the plates 134 and 136 in a predetermined alignment.

An additional series of circumferentially spaced through bores 148 are formed in and extend through the body 112. Circumferentially spaced bores 150 are also formed in the end plate 142 and are alignable with the bores 148. Suitable fasteners, such as nuts and bolts, dowels or combinations thereof, may be mounted in the aligned bores 148 and 150 to securely retain the body 112 and the end plate 142 together. This additional joining means resists torque which may be exerted on the teeth of the shaving cutter 10 during use of the shaving cutter and prevents any twisting or movement of the cutting teeth on the plates 134 during such use.

In the embodiment shown in FIG. 4 and described above, the first and second plates 34 and 36 are formed with equal diameters between circumferentially opposed end lands 52 on the first plate 34 and between opposed end lands 60 on the second plate 36. This provides full radial length teeth 58 on the second plate 36, each tooth 58 being adjacent to and equal in radial length to a tooth 44 on an adjacent first plate 34 to fully support the each tooth 44 on the first plate 34. This also enables all of the plates 34 and 36 on the shaving cutter 10 to be dressed or re-sharpened at the same time while on the shaving cutter 10.

Figure 17:
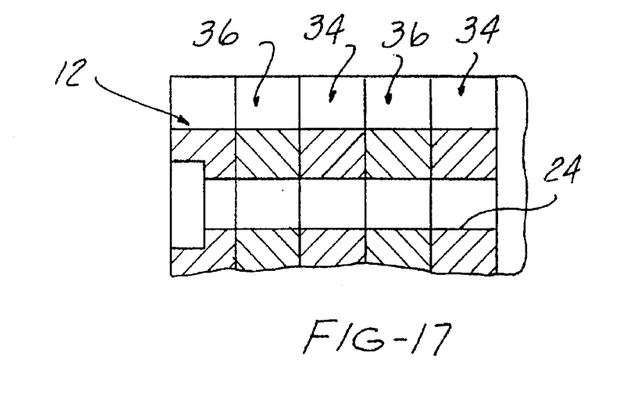
FIG. 17 is an enlarged, partial, side elevational view of an alternate embodiment of the present invention.

Further, in this embodiment, the first and second plates 34 and 36 are formed with equal thicknesses. Alternately, as shown in FIG. 17, the second plates 36 are formed with a thickness greater than that of the first plates 34 for additional support for the cutting teeth 44 on the first plates 34.

Figure 13:
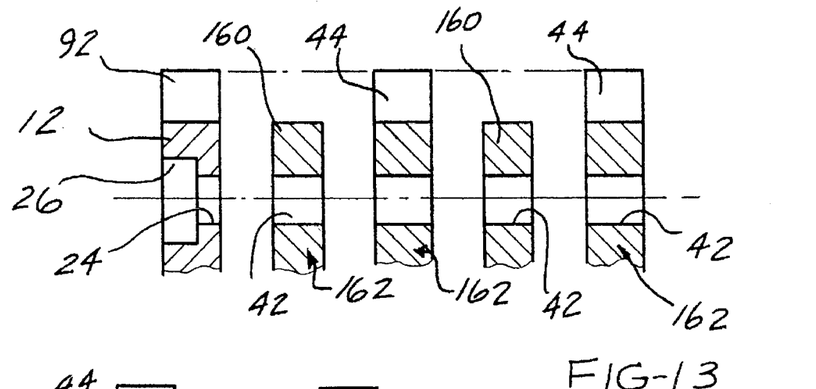
FIG. 13 is a partial, enlarged, exploded view showing an alternate embodiment of the spacing means disposed between adjacent plates having cutting edges thereon.

Another embodiment of the spacing means is shown in FIG. 13. In this embodiment, the body 12 and the first plates 34 as well as the end plate 80, not shown, have the same identical construction as that described above and shown in FIGS. 1–4. In this embodiment, however, the second plates, denoted in FIG. 13 by reference number 160, have a diameter less than the diameter of the first plates 42 from the center of the first plates 42 to the base or root of each tooth 44. This creates a space or groove between each of the teeth 44 on the first plates 42 as well as the teeth 92 on the body 12 and the corresponding teeth on the end plate 80 for chip removal. Bores 24 in the body 12, bores 42 in the first plates 42, and bores 162 in the second plates 160, are aligned and interconnected by suitable fasteners to secure the plurality of first and second plates 42 and 160 to the body 12 and the end plate, not shown, in the same manner as described above and shown in FIGS. 1–3.

Figure 14:
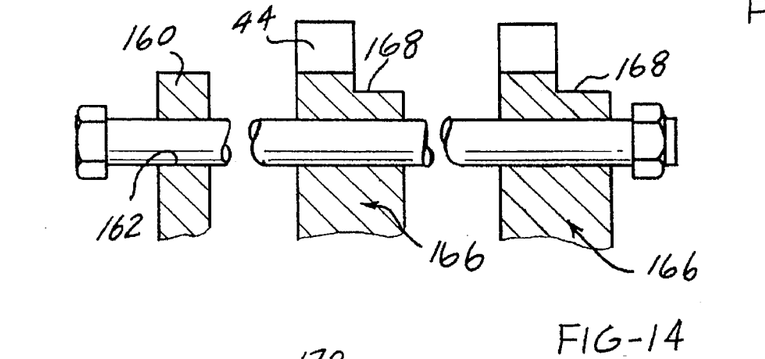
FIG. 14 is a partial, enlarged, exploded view of yet another embodiment of the spacing means employed between adjacent plates having cutting teeth thereon.

Another embodiment of the spacing means is shown in FIG. 14. In this embodiment, each of the first plates 166 is provided with a plurality of circumferentially spaced teeth 44, as described above. However, each first plate 166 is provided with an enlarged annular shoulder 168. The outer diameter of the shoulder 168 is less than the diameter to the base or root of the cutting teeth 44 to thereby form a space or groove between the cutting teeth 44 on adjacent first plates 166 when a plurality of first plates 166 are stacked together and interconnected by joining means. Such joining means may comprise bolts and nuts as shown in FIG. 14. A ring-like second plate 160, similar to the second plate 160 shown in FIG. 13 and described above, may be employed at the outer ends of the co-axially aligned first plates 166.

This embodiment of the shaving cutter of the present invention is ideally suited for cutting teeth 44 having a large thickness. Such teeth are self-supporting and do not require support from second teeth as in the other embodiments described above.

This embodiment is particularly advantageous in that a separate body 12 and end plate 80 are not required. However, the width of the cutting teeth 44 on each of the first plates 166 must be sufficient in order to resist forces during use of the shaving cutter without deformation or movement of the cutting teeth 44. It will also be understood that the embodiment shown in FIG. 13 in which the second plates 160 have a reduced diameter may also merely include the first and second plates without a separate body and end plate. However, the requirement for a substantial thickness for the cutting teeth 44 on the first plates 42 still remains.

Figure 18:
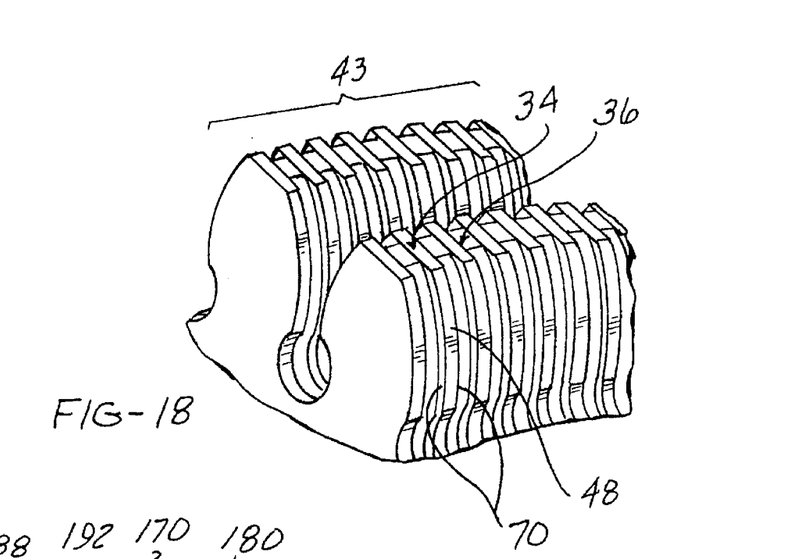
FIG. 18 is a partial, perspective view showing a helical arrangement of the teeth on the first and second plates.

In the embodiments described above and shown in FIGS. 4, 13 and 14, the side lands 48 of the teeth 44 on the first plates 34 in FIGS. 4 and 13 and the teeth 166 on the first plates 166 in FIG. 14 are co-axially aligned for a spur shaving cutter. Alternately, the teeth 44 on the first plates 34 and the teeth 58 on the second plates 36 may be arranged in a helix along the axial length of the shaving cutter 10 as shown in FIG. 18. This is easily achieved by forming a plurality of identical first plates 34 with cutting teeth 44 and a plurality of identical second plates 36 with cutting teeth 58 as described above and then forming the bores 42 and 56 in each of the first and second plates 34 and 36 in a circumferentially offset manner from plate to plate such that the teeth 44 and 58 are arranged in a helix when fasteners are inserted through the bores 42 and 56 in the first and second plates 34 and 36. In such a helical arrangement, the side lands 48 of the teeth 44 and 58 are formed at non-perpendicular angles with respect to the major faces of each tooth 44 and 58 as shown in FIGS. 15, 16 and 19.

Figures 15, 16:
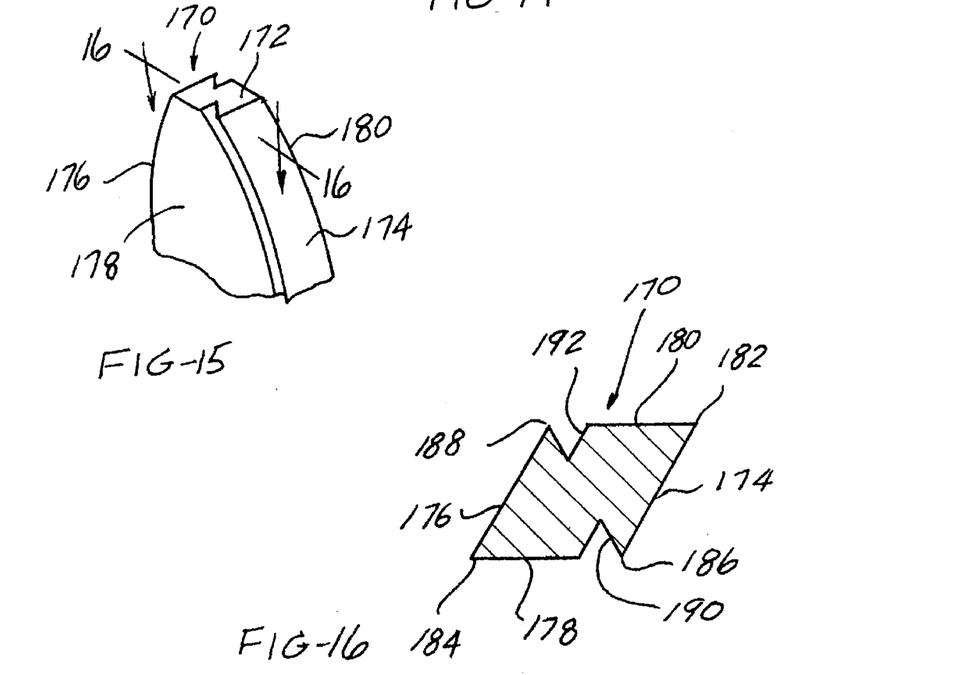
FIG. 15 is an enlarged, perspective view of an alternate embodiment of one of the teeth on one of the first plates of the shaving cutter of the present invention.
FIG. 16 is a cross sectional view generally taken along line 16—16 in FIG. 15.
Figure 19:
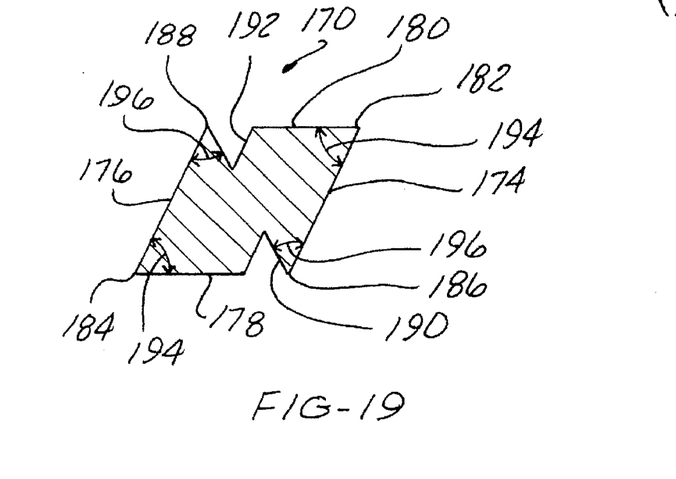
FIG. 19 is a cross sectional view, similar to FIG. 16, but showing an alternate embodiment of the cutting edges of the cutting teeth on the first plates.

In FIGS. 15, 16 and 19 tooth 170 represents one of the cutting teeth on any of the first plates 34 described in the previous embodiments, such as the first plate 34 shown in FIGS. 3 and 4. The cutting tooth 170 includes a top land 172, opposed side lands 174 and 176 and opposed front and back major surfaces 178 and 180, respectively. Since each of the plurality of first plates 34 may be formed one plate at a time, virtually any angle may be formed on the cutting edges of each tooth 170 by a simple grinding operation.

In a helical arrangement of the cutter teeth, the adjacent side lands 174 and 176 and the front and back surfaces 178 and 180 of the cutting tooth 170 are disposed at non-perpendicular angles as shown in FIGS. 15, 16 and 19. The adjacent side lands 174 and 176 and the front and back major surfaces 178 and 180 form two pairs of diagonally opposed cutting edges. A first pair of diagonally opposed cutting edges is formed between the side land 174 and the back surface 180 and between the opposed side land 176 and the front surface 178. These cutting edges are depicted by reference numerals 182 and 184, respectively. An opposite pair of diagonally opposed cutting edges 186 and 188 are formed respectively between the side land 174 and the front surface 178 and between the side land 176 and the back surface 180. Since each first plate 34 is formed one plate at a time, the angle forming the cutting edges 186 and 188 may be formed at any predetermined angle. In one embodiment shown in FIG. 16, the predetermined angle forming the cutting edges 186 and 188 matches or is equal to the angle forming the opposed pair of cutting edges 182 and 184 to equalize cutting pressure on each tooth 170. Optionally, as shown in FIG. 19, the angles 194 between opposed surfaces and side lands which form the cutting edges 182 and 184 on each tooth 170, although equal to each other, may be unequal to the angles 196 forming the diagonally opposed pair of cutting edges 186 and 188. The angle forming the cutting edges 186 and 188 is formed by machining a groove 190 and 192, such as by grinding, shaping, rolling or by laser or wire cutting, in the front and back surfaces 178 and 180, respectively, of the cutting tooth 170. It should be noted that the angle formed by the grooves 190 and 192 may be any angle to suit the needs of a particular application.

It should be noted that each cutting edges 182, 184, 186 and 188 may be coated with a protective coating of titanium carbide or titanium nitride, for example, which provide a smooth, high strength surface to increase the life of each cutting edge between resharpenings.

In summary, there has been disclosed a unique wafer shaving cutter which overcomes certain of the problems associated with previously devised shaving cutters which form a plurality of cutting teeth as serrated edges formed in a unitary, single-piece body. The present wafer shaving cutter forms the cutting edges of each tooth in a serrated form from a plurality of first plates having cutting teeth formed circumferentially thereon which are spaced apart by spacer means including spacer rings, a set of plates having smaller sized teeth formed circumferentially thereon, or by reduced diameter shoulders integrally formed with the first plate.

By utilizing the features of this invention, a wafer shaving cutter can be manufactured at a low cost. Further, any damaged plates carrying the cutting teeth can be easily repaired or replaced by merely removing such plates from the wafer shaving cutter and inserting a new plate, thereby eliminating the need for a completely new shaving cutter. Further, the present wafer shaving cutter may be constructed such that the angles forming diagonally opposed cutting edges on the teeth of the first plates may be formed at any desired angle depending on application requirements, such as at equal angles or with each diagonal pair of angles being unequal.

Finally, by uniquely surface grinding the major faces of each plate and the major faces of each tooth thereon to a smooth finish, the useful life of the present shaving cutter is dramatically increased over that of previously devised shaving cutters and, further, variations in plate thickness are eliminated to enable the teeth to be arranged helically along the shaving cutter for shaving helical gears.

What is claimed is:

1. A wafer shaving cutter comprising:

a plurality of annular first plates, each having opposed major faces and a plurality of circumferentially spaced, radially extending teeth formed thereon, each tooth having major opposed faces, an outer end land, opposed side lands in a predetermined gear tooth profile, and cutting edges formed at a juncture of the side lands and the major faces, each first plate having an identical first width between opposed major faces;

a plurality of second annular plates alternatingly arranged with the plurality of first plates, each of the plurality of second plates having opposed major faces and a plurality of circumferentially spaced, radially extending teeth formed thereon, each tooth having opposed major faces, an outer end land, opposed side lands in a predetermined gear tooth profile, an axial thickness of each of the teeth on the plurality of second plates being smaller than a corresponding axial thickness of the teeth on each of the plurality of first plates, each second plate having an identical second width between opposed major faces;

the major faces of the first and second plates and the major faces of each tooth thereon formed as surface ground, smooth finish plates faces, a coating of one of titanium carbide and titanium nitride disposed on the cutting edges;

each tooth on each of the first plates aligned with a tooth on adjacent first plates to form a composite tooth with grooves therebetween; and means for joining the plurality of first plates and the plurality of second plates into a fixed, unitary arrangement in which the teeth on the first and second plates extend helically along the shaving cutter.

2. The wafer shaving cutter of claim 1 wherein:

the teeth in the first plates have opposite pairs of diagonally opposed cutting edges, each formed between one adjacent major surface and one side land of each tooth; and an included angle between the adjacent major surface and side land for all of the cutting edges of the teeth on the first plates being identical.

3. The wafer shaving cutter of claim 1 wherein:

the second width of the second plates is greater than the first width of the first plates.

4. The wafer shaving cutter of claim 1 wherein the spacing means comprises:

an annular shoulder integrally formed as a single piece with each of the plurality of first plates and having a diameter less than the height of the teeth on each of the plurality of first plates.

5. The wafer shaving cutter of claim 1 wherein the joining mean comprises:

a plurality of circumferentially spaced bores formed in the first plate; and fasteners extending through the bores to fixedly join the plurality of first plates together.

6. The wafer shaving cutter of claim 1 wherein the body further includes:

a reduced diameter second end portion having a diameter less than the diameter of the intermediate sleeve on the body; and the end plate being mountable on the reduced diameter second end portion of the body.

7. The wafer shaving cutter or claim 1 wherein the spacing means comprises:

a plurality of second annular plates alternatingly arranged with the plurality of first plates, each of the plurality of Second plates having an outer diameter less than the height of the teeth on the first plate.

8. The wafer shaving cutter of claim 7 wherein he joining means comprises:

a plurality of circumferentially spaced bores formed in the first and second plates; and fasteners extending through the bores in the first and second plates to fixedly join the plurality of first and second plates together.

9. The wafer having cutter of claim 8 further comprising:

an end plate; and means for mounting the end plate on the second end of the body.

10. The wafer shaving cutter of claim 9 wherein:

a plurality of circumferentially spaced teeth are formed on the periphery of at least one or the first end portion of the body and the end plate, the teeth having the same size and shape as the teeth on the second plates.

11. The wafer shaving cutter of claim 10 wherein the joining means comprises:

a body having first and second opposed ends;

the plurality of first plates and the spacing means being mounted on the body between the first and second ends of the body;

a plurality of circumferentially spaced bores formed in the body and each of the first plates and the spacing means; and fasteners extending through the aligned bores in the body, the first plates and the spacing means to fixedly join the body, the first plates and the spacing means together.

12. The wafer shaving cutter of claim 9 wherein the end plate mounting means comprises:

a reduced diameter second end portion formed on the body an having a diameter less than the diameter of the intermediate sleeve on the body;

the end plate mountable on the reduced diameter second end portion of the body.

13. The wafer shaving cutter of claim 9 wherein the end plate mounting means comprises:

the end plate having an internal bore sized to concentrically engage the intermediate sleeve of the body at the second end of the body.

14. A wafer shaving cutter comprising:

a plurality of annular first plates, each having opposed major faces and a plurality of circumferentially spaced, radially extending teeth formed thereon, each tooth having major opposed faces, an outer end land, opposed side lands in a predetermined gear tooth profile, and cutting edges formed at a juncture of the side lands and the major faces, each first plate having an identical first width between opposed major faces;

plurality of second annular plates alternatingly arranged with the plurality of first plates, each of the plurality of second plates having opposed major faces and a plurality of circumferentially spaced, radially extending teeth formed thereon, each tooth having opposed major faces, an outer end land, opposed side lands in a predetermined gear tooth profile;

the teeth in the first plates have opposite pairs of diagonally opposed cutting edges, each formed between one adjacent major surface and one side land of each tooth; and an included angle between the adjacent major surface and adjacent side land of one pair of diagonally opposed cutting edges being unequal to the included angle between the adjacent major surface and adjacent side land of the diagonally opposed pair of cutting edges;

each tooth on each of the first plates aligned with a tooth on adjacent first plates to form a composite tooth with grooves therebetween; and means for joining the plurality of first plates and the plurality of second plates into a fixed, unitary arrangement in which the teeth on the first and second plates extend helically along the shaving cutter.

15. A waver shaving cutter comprising:

a plurality of annular first plates, each having opposed plates faces and a plurality of circumferentially spaced, radially extending teeth formed thereon, each tooth formed thereon, each tooth having major opposed faces, an outer end land, opposed side lands in a predetermined gear tooth profile, and cutting edges formed at a juncture of the side lands and the major faces, each first plate having an identical first width between opposed major faces;

a plurality of second annular plates alternatingly arranged with the plurality of first plates, each of the plurality of second plates having opposed major faces and a plurality of circumferentially spaced, radially extending teeth formed thereon, each tooth having opposed major faces, an outer end land;

a recess is formed in the major opposed faces of each tooth of the first plates to form an angle of the cutting edges of one pair of diagonally opposed cutting edges;

each tooth on each of the first plates aligned with a tooth on adjacent first plates to form a composite tooth with grooves therebetween; and means for joining the plurality of first plates and the plurality of second plates into a fixed, unitary arrangement in which the teeth on the first and second plates extend helically along the shaving cutter.

* * * * *